(12) United States Patent
Melin

(10) Patent No.: US 7,131,811 B2
(45) Date of Patent: Nov. 7, 2006

(54) RAIL SYSTEM

(75) Inventor: Bo Melin, Smalandsstenar (SE)

(73) Assignee: EAB AB, Smalandsstenar (SE)

( * ) Notice: Subject to any disclaimer, the term of this patent is extended or adjusted under 35 U.S.C. 154(b) by 0 days.

(21) Appl. No.: 10/907,730

(22) Filed: Apr. 13, 2005

(65) Prior Publication Data

US 2005/0191156 A1    Sep. 1, 2005

Related U.S. Application Data

(63) Continuation of application No. PCT/SE2003/001568, filed on Oct. 9, 2003.

(30) Foreign Application Priority Data

Oct. 14, 2002    (SE) .................................... 0203024

(51) Int. Cl.
  *B65G 1/00* (2006.01)
(52) U.S. Cl. .................... 414/277; 414/279; 414/495
(58) Field of Classification Search ................ 414/276, 414/277, 279, 495
  See application file for complete search history.

(56) References Cited

U.S. PATENT DOCUMENTS 4,395,181 A    7/1983  Loomer 4,459,078 A  *  7/1984  Chiantella et al. .......... 414/279
5,033,928 A       7/1991  Suominen

FOREIGN PATENT DOCUMENTS

GB    1595257 A    8/1981
SE     449471 B   10/1986

OTHER PUBLICATIONS

International Search Report from PCT /SE2003/001568.

* cited by examiner

*Primary Examiner*—Eileen Lillis
*Assistant Examiner*—Charles A. Fox
(74) *Attorney, Agent, or Firm*—White, Redway & Brown LLP

(57) ABSTRACT

A system for the deep racking storage of pallets includes at least one pair of rails which are intended for supporting pallets. The rails are of sufficient length to support several pallets. A carriage is positionable on a pair of rails and drivable therealong for moving the pallets. Each rail has an upper, longitudinal support surface and a lower, longitudinal rolling surface. The support surface is intended for supporting the pallets, while the rolling surface is intended for the carriage. On each rail, the support surface and the rolling surface are interconnected to one another by the intermediary of side walls. The side walls together form a space which tapers from above and downwards for aligning a carriage when this is lowered towards the rolling surface.

13 Claims, 2 Drawing Sheets

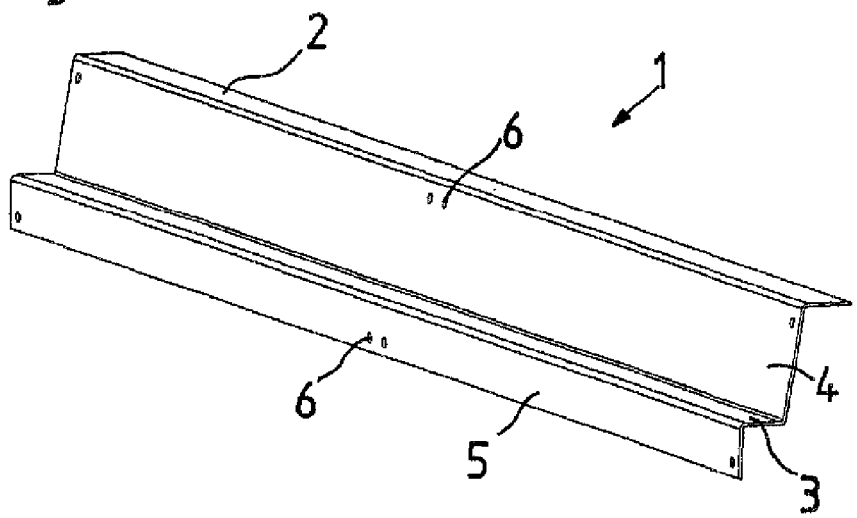
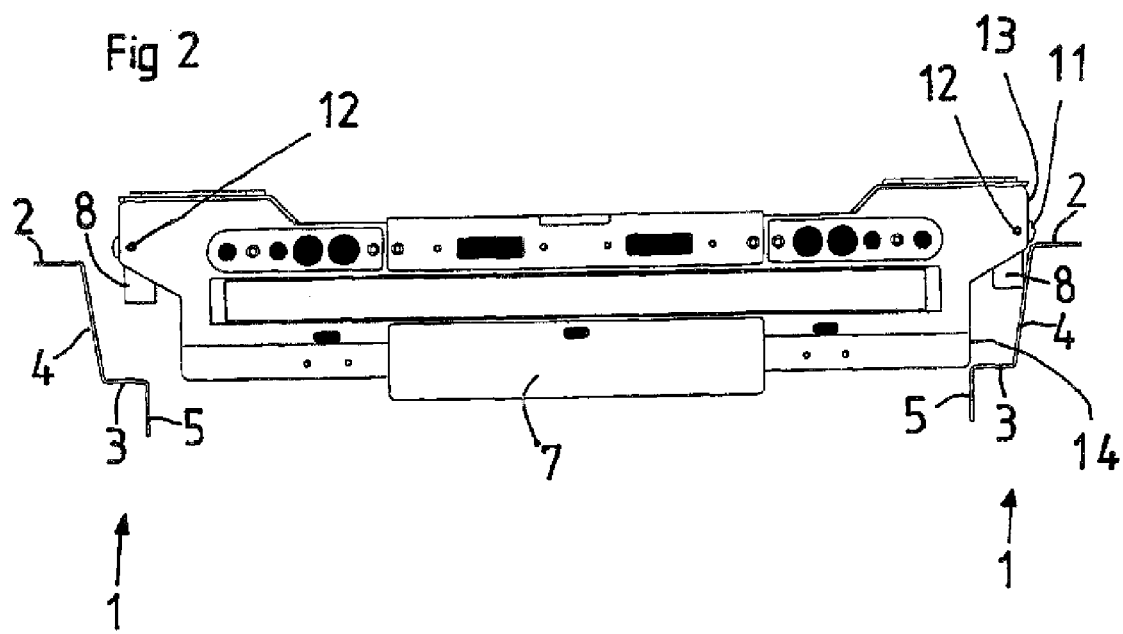

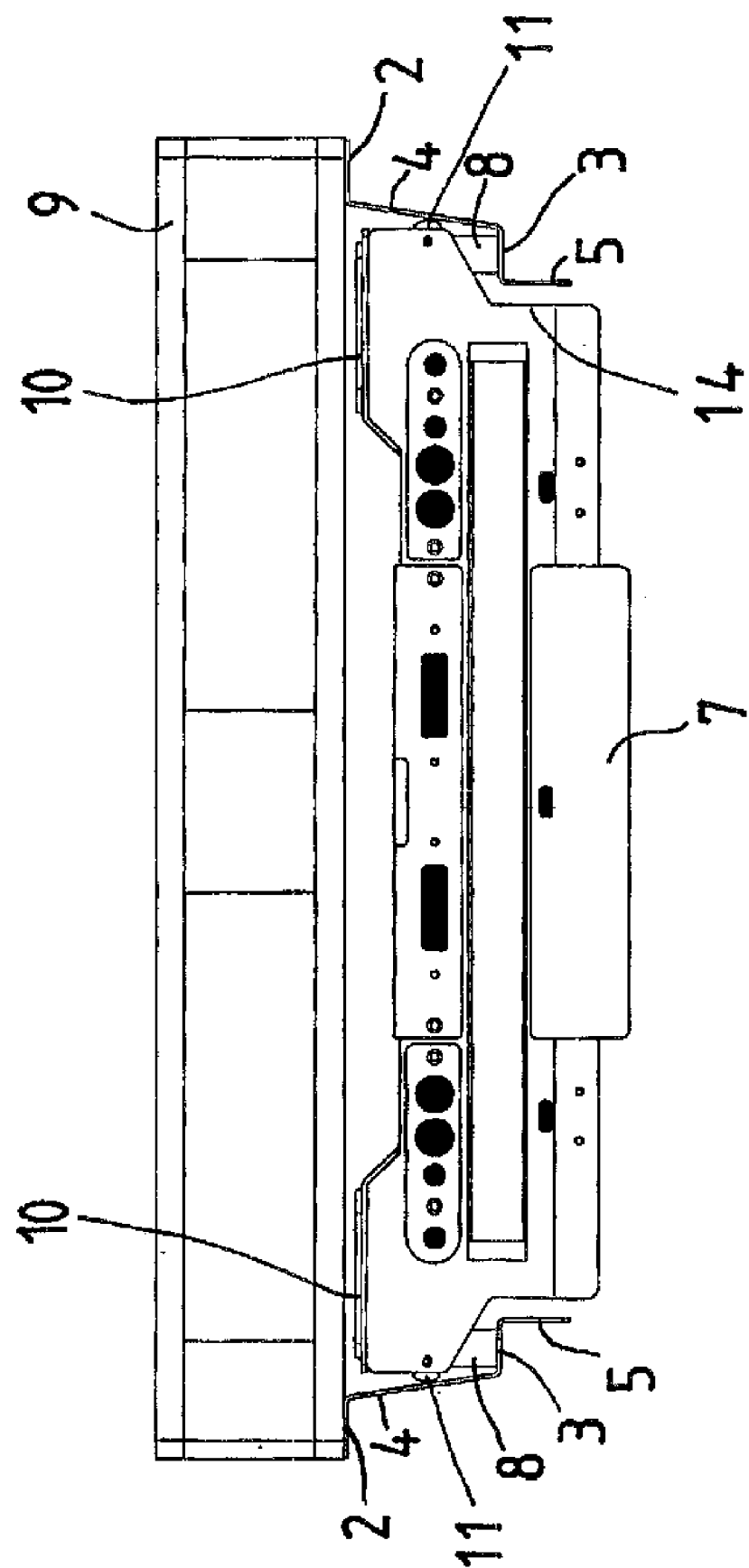

RAIL SYSTEM

DESCRIPTION

1. Technical Field

This application is a continuation of International Application No. PCT/SE2003/001568, filed Oct. 9, 2003, which designated the U.S.

The present invention relates to a system for the deep racking storage of pallets, comprising at least one pair of rails intended for carrying pallets, the rails being of a length sufficient to support a plurality of pallets, and a carriage which is positionable on a pair of rails and drivable therealong, for displacing the pallets along the pair of rails, each rail in the pair having an upper, longitudinal support surface for supporting the pallets and a lower, longitudinal rolling surface along which the carriage is drivable.

2. Background Art

Deep racking stores have long been known in the art. A deep racking store is constructed with relatively few aisles and storage spaces which have a relatively great depth extent, i.e. away from the most proximal aisle. Not all parts of the deep racking store are accessible solely with the aid of a standard fork-lift truck. In the deep racking store there is provided a large number of pairs of rails, partly in several planes or storeys in the vertical direction and partly adjacent one another in rows. A large number of pallets is placed on each pair of rails. The ends of the rails are directed out towards the aisles.

In order for it to be possible to place pallets in those positions where the fork-lift truck does not reach, there is at least one electrically driven transport carriage which is movable along the pair of rails and which can carry a pallet between the end of the pair of rails and the desired position of storage, or vice versa. In turn, the carriage is movable with the aid of the fork-lift truck between different pairs of rails in the deep racking store and between the deep racking store and an electric charging station. When a pallet has been transported out to a position close to an aisle, it can be reached by the fork-lift truck and be lifted down by it. Correspondingly, a pallet is lifted by the fork-lift truck and placed at the end of the pair of rails. From thence, the carriage transports the pallet inwards to an unoccupied position in the deep racking store. By such means, maximum use is made of the storage space available and storage takes place in as a cost-effective manner as possible.

In order for the system to function satisfactorily, it is important that the carriage runs reliably and faultlessly on the rails. One method of achieving this is by means of rails that are closed upwards, i.e. they display a substantially C-shaped profile in which the wheels of the carriage run in the lower region of the C. One example of such an upwardly closed rail for the carriage wheels is shown in EP 197 448. In such instance, the upper area of the profile is employed as an offloading surface for the pallets. However, in order to move the carriage between different rack levels in the this type of system, it is necessary that it be moved in from the ends of the rails.

Another alternative is that recesses are provided in the upper area of the profile so that the carriage may be lifted up or deposited only when its wheels are located straight under or over the recesses; and it is a difficult and time-consuming operation to achieve the precision required for this manoeuvre to be successful. In order to ensure that the carriage is retained in position on the rails, a restriction in the lateral direction may be provided so that the wheels of each respective carriage run in a trough defined on both sides. Unfortunately, switching of the carriage between different rack levels is a complex operation. In order for the carriage to be positioned in the correct manner, this must be put into effect with great precision, which places extreme requirements on the store personnel and also takes up considerable time.

The insertion or lowering of the carriage on the rails is put into effect with the aid of a fork-lift truck and it is difficult—not to say impossible—to achieve a high degree of precision in positioning using such a vehicle. Moreover, it also happens that the carriage may be slightly twisted in the horizontal plane when it is loaded on the forks of the fork-lift truck. Thus, its longitudinal axis will not be parallel with the rails even if the forks of the fork-lift truck are. This entails that the wheels of the carriage may perhaps not be placed straight on the surfaces where they are intended to run, with a risk of operational stoppage or even that the carriage is completely derailed, falls and is damaged.

In addition to the above-outlined complex of problems, the rails are often of complicated shape and are expensive and circumstantial to manufacture.

Problem Structure

There is hence a need in the art to design the system intimated by way of introduction so that this satisfies the requirements of rapid and reliable movement of the carriage between the different rack levels of the deep racking stores, at the same time as the carriage is aligned correctly, even if it is not in a completely correct position in relation to the pair of rails before being lowered down onto them. The system should be simple, in order to make for manufacture and assembly at low cost.

Solution

The objects forming the basis of the present invention will be attained if the system intimated by way of introduction is characterised in that in each rail, the upper support surface and the lower rolling surface are interconnected by the intermediary of side walls which, for aligning a carriage when this is lowered down towards the rolling surface, form a space which tapers from above and downwards.

BRIEF DESCRIPTION OF THE ACCOMPANYING DRAWINGS

The present invention will now be described in greater detail hereinbelow, with reference to the accompanying Drawings. In the accompanying Drawings:

FIG. 1 is a perspective view of a part of a rail included in the system;

FIG. 2 is an end elevation of a carriage included in the system in the process of being placed on a pair of rails according to FIG. 1; and FIG. 3 is an end elevation corresponding to that of FIG. 2 where the carriage and a pallet are disposed on the pair of rails.

DESCRIPTION OF PREFERRED EMBODIMENT

The present invention is intended for use in a deep racking store where many pairs of rails are disposed on several storeys and in several rows side-by-side. The pairs of rails are long so that they have room for a large number of pallets in the depth direction. The following description will substantially focus on a single one of these pairs of rails.

FIG. 1 shows a part of a rail 1 which is included in a deep racking store. The rails 1 are disposed in pairs at such mutual spacing from one another that the distance between them permits a carriage to be run thereon for the transport of pallets in the deep racking store. A large number of pairs of rails are provided on different levels for building up the entire deep racking store.

The rail 1 has an upper, longitudinal support surface or carrier surface 2 at its upper end. The support surface 2 is disposed so that it will be substantially horizontal when the rail 1 has been assembled. Pallets are intended to rest on the support surface 2.

The rail 1 further has a lower support surface or rolling surface 3. Like the support surface 2, the rolling surface 3 is substantially horizontal when the rail 1 is in its assembled state. The rolling surface 3 is also elongate and is located in a plane which is substantially parallel with the plane of extent of the support surface 2. The support surface 2 and the rolling surface 3 are interconnected along each edge by a side wall 4 which extends substantially throughout the entire length of the surfaces 2 and 3. The side wall 4 slopes outwards so that the support surface 2 is wholly located beside the rolling surface 3. Hence, the two surfaces 2 and 3 do not overlap one another. When two rails 1 are assembled in a united pair, the two rolling surfaces 3 will be located closer to one another than are the two support surfaces 2.

Since the support surface 2 is located beside the rolling surface 3, two rails 1 which have been mounted side-by-side will form an upwardly open track.

At its one or outer edge, the rolling surface 3 is connected to the side wall 4, while a downwardly directed flange 5 is disposed at its other or inner edge. The purpose of this flange 5 is principally to rigidify. However, a number of anchorage holes 6 may be provided therein like the side wall 4. The rails 1 are supported by anchorage plates whose shape corresponds to the profile of the rails 1. In their turn, the anchorage plates are disposed on beams which extend transversely of the longitudinal direction of the rails and which outermost are supported by vertical posts in the deep racking store. The beams are disposed with uniform spacing in such spaced apart relationship that the rails 1 are kept straight even under loading from the pallets disposed in the deep racking store.

Further, means for positioning the carriage running on the rails can be provided on the side walls 4.

The positioning takes place substantially with the aid of photocells which are disposed on the carriage. Holes, so-called reading holes, are provided on the rails at predetermined positions, typically close to the ends. Moreover, there are provided purely mechanical arrest members at the ends of the rails. Additional photocells may be provided on the carriage for locating existing pallets on the pair of rails.

The configuration of the rails 1 is such that manufacture is simplified, in particular in comparison with the C-shaped profiles mentioned by way of introduction. Since the two support surfaces 2 and 3 are disposed on one and the same rail, assembly is also simple.

FIG. 2 shows a pair of assembled rails 1 on which a carriage 7 is in the process of being positioned. The rails 1 are disposed such that the outer edges of the support surfaces 2 face away from one another, while the side walls 4 slope inwards and downwards towards the opposing rail 1. The rails 1 are located flush with one another so that both the support surfaces 2 and the rolling surfaces 3 are located flush with one another.

When the carriage 7 is placed by lowering on the rails 1 as shown in FIG. 2, it often happens that the carriage is not correctly aligned laterally. However, since the carriage 7 is positioned with the aid of a fork-lift truck, it is largely substantially horizontal. Thus, there is no reason to believe that the carriage 7 would be so offset obliquely that it risks falling down between the rails. Thus, the alignment of the as good as horizontal carriage 7 takes place in the horizontal plane which the carriage 7 assumes at any given time and is defined by the position of the forks of the fork-lift truck.

For alignment in the lateral direction of a not entirely correctly positioned carriage 7 when this is lowered down onto a pair of rails, use is made in principle of two different guide members on the carriage, namely on the one hand its wheels 8 and on the other hand its castors 11 which are disposed one at each corner of the carriage. The castors, which are rotary about horizontal stub shafts 12, extend laterally a slight distance outside upper side surfaces 13 on the carriage, but also somewhat outside the outer side surfaces of the wheels 8.

When the carriage 7 has been lowered down towards the rails 1, it will, if it has not already from the outset been perfectly aligned in relation to the rails 1, come into contact with them. On condition that the carriage 7 is more or less correctly positioned, i.e. that it is located inside the area defined by the rails 1, one of its wheels 8 will first come into contact with one of the side walls 4 as shown in FIG. 2. As the forks of the fork-lift truck, and thereby the carriage 7, are lowered, the side wall 4 will, as a result of its sloping, exercise a contact force with a laterally directed force composant which causes the carriage 7 to slide laterally on the forks of the fork-lift truck at the same time as they are lowered.

When the lowering of the carriage 7 has continued a certain distance, one or more of the castors 11 come into contact with the side walls 4 of the rails 1 and take over the steering effect from the wheels 8. As a result, the carriage 7 is prevented from "jumping" or "climbing" downwards along the side walls 4 since instead the castors 1 will roll down along them until the wheels 8 of the carriage 7 rest on the rolling surface 3.

There is no risk that the carriage 7 slides too far in the lateral direction, since the wheel 8 which is in contact with the side wall 4 during the opening phase of the lowering of the carriage 7, and the castor 11 which is in contact with the side wall during the latter phase of the lowering operation, do not release this contact. Moreover, the opposing side wall 4 will prevent the opposing wheel 8 and the opposing castor 11 from being moved too far to the side. There is no contact between the lower side surfaces 14 of the carriage 7 and the rails 1.

The carriage 7 does not necessarily slide straight in the lateral direction. In those cases where the carriage 7 is twisted in the horizontal plane, only one or two diagonally opposing wheels 8, or one or two diagonally opposing castors 11 will come into contact with each respective side wall 4, whereby a correctional twisting is realised. When the carriage 7 has been lowered a sufficient distance, the wheels 8 will come into contact with the rolling surfaces while their side surfaces are free from the side walls 4 and possible contact in the lateral direction is realised by means of the castors 11. The carriage 7 has then become perfectly aligned on the rails 1.

Since the rails 1 are upwardly open, the carriage 7 can be lifted up and lowered down anywhere whatever on the track constructed from the rails 1. However, one precondition is that some form of lifting arrangement can reach the carriage 7 in the position which it temporarily assumes. However, in practice this implies that the carriage 7 will essentially be lowered down on the rails 1 at their ends.

The profiles of the carriage 7 and the rails 1 are adapted so that the side surfaces 4 are those surfaces of the rails 1 that first come into contact with the carriage 7, preferably with the wheels 8 for a guiding-in of the carriage 7. If the carriage 7 is not obviously located outside the track defined by the rails 1, it will not need to be lifted up for a new attempt to be positioned on the rails 1.

The rolling surfaces 3 are defined in the lateral direction outwardly by the side walls 4. However, at their inner edges, there are no such restricting definitions. However, the positioning of the rails 1 is so well adapted to the width and design of the carriage 7 that the wheels 8 will nevertheless remain on the rolling surfaces 3. Before a wheel 8 runs the risk of coming far too far inwards on the rolling surfaces 3 and falling off, one or both of the castors 11 on the opposing side of the carriage 7 will have come into contact with the adjacent side wall 4 and prevent the carriage 7 from moving further in the lateral direction. The side walls 4 and the castors 11 thus cooperate to keep the carriage 7 in position on the track during operation.

FIG. 3 shows how the carriage 7 has been placed correctly on the rails 1 with its wheels 8 resting on the rolling surfaces 3. The carriage 7 is thereby reciprocally movable along the rails 1 and it will be apparent from the Drawing that the lower side surfaces 14 of the carriage are spaced from adjacent downwardly directed flanges 5 on the rails 1.

FIG. 3 shows the carriage 7 under a pallet 9 which has been placed on the support surfaces 2. The pallet 9 is positioned as follows. The carriage 7 is placed at the end of the rails 1 in the manner described above. A pallet 9 which is desired to be positioned in the deep racking store is lifted up on the same (or similar) fork-lift truck as placed the carriage 7 on the rails 1. The pallet 9 is placed on the support surfaces 2 as shown in FIG. 3. The carriage 7 is provided with a lifting arrangement by means of which the entire carriage 7 can be lifted in that its wheels 8 are lowered so far that lifting members 10 disposed on the upper side of the carriage come into contact with the underside of the pallet 9 and lift the pallet a short distance above the upper support surfaces 2. The pallet 9 is now movable together with the carriage 7. The carriage 7, which may be remote-controlled, transports the pallet 9 to the desired position in the deep racking store, i.e. somewhere along the rails 1 on which the carriage 7 is mounted. When the desired position has been reached, the carriage 7 is lowered by the lifting members 10 and the pallet 9 once again comes into contact with the support surfaces 2. The lifting members 10 lose contact with the underside of the pallet 9, which entails that the carriage 7 is once again freely movable. The carriage 7 is now movable out to the end of the rails 1 for moving to another racking storey or alternatively for transport of additional pallets.

As one alternative, the wheels 8 of the carriage 7 may be fixed in the vertical direction and instead the lifting members 10 be disposed to be raisable and lowerable under the action of the lifting arrangement.

When it is desired to collect a pallet 9 stored in the deep racking store, the carriage 7 is despatched to this pallet, whereafter its lifting members 10 are raised and the pallet 9 can once again be transported in a manner corresponding to that described above.

The present invention may be modified without departing from the scope of the appended claims.

What is claimed is:

1. A system for the deep racking storage of pallets, comprising at least one pair of rails intended for carrying pallets, the rails being of a length sufficient to support a plurality of pallets, and a carriage which is adapted to be driven on a pair of rails upon being positioned on the pair of rails by a forklift, for displacing the pallets along the pair of rails, each rail in the pair having an upper, longitudinal support surface for supporting the pallets and a lower, longitudinal rolling surface along which the carriage is drivable, wherein on each rail the upper support surface and the lower rolling surface are interconnected by side walls which, for aligning the carriage when the carriage is lowered down towards the rolling surface, form a space which tapers from above and downwards.

2. The system as claimed in claim 1, wherein, in each pair of rails, each rail has its rolling surface and its side wall freely exposed from above, at least such a distance from a free end of a pair of rails that the distance at least corresponds to a length of the carriage.

3. The system as claimed in claim 1 wherein the rolling surface on each respective rail is open at its edge located opposing the side wall.

4. The system as claimed in claim 1 wherein a distance between a lower side edge of the carriage and an outer edge of the adjacent wheels is greater than the width of the rolling surface.

5. The system as claimed in claim 1 wherein two or more pairs of rails are disposed above one another.

6. The system as claimed in claim 2, wherein the rolling surface on each respective rail is open at its edge located opposing the side wall.

7. The system as claimed in claim 2, wherein a distance between a lower side edge of the carriage and an outer edge of the adjacent wheels is greater than the width of the rolling surface.

8. The system as claimed in claim 3, wherein a distance between a lower side edge of the carriage and an outer edge of the adjacent wheels is greater than the width of the rolling surface.

9. The system as claimed in claim 2, wherein two or more pairs of rails are disposed above one another.

10. The system as claimed in claim 3, wherein two or more pairs of rails are disposed above one another.

11. The system as claimed in claim 4, wherein two or more pairs of rails are disposed above one another.

12. The system as claimed in claim 1, wherein the wheels of the carriage are adapted to roll along the longitudinal rolling surface.

13. The system as claimed in claim 1, wherein the side walls form a space which tapers from above and downwards for steering the carriage by contact with the wheels of the carriage.

* * * * *